(12) United States Patent
Tang et al.

(10) Patent No.: US 7,427,577 B2
(45) Date of Patent: Sep. 23, 2008

(54) SINTERED POLYCRYSTALLINE TERBIUM ALUMINUM GARNET AND USE THEREOF IN MAGNETO-OPTICAL DEVICES

(76) Inventors: Yin Tang, 640 Hidden Valley Club Dr., #202, Ann Arbor, MI (US) 48104; Anthony C. Sutorik, 340 E. Miller Ave., Milan, MI (US) 48160; Long Nguyen, 237 Main St., Belleville, MI (US) 48111; Tom Hinklin, 6324 Sturbridge Dr., Kalamazoo, MI (US) 49004-9652; William H. Rhodes, 4 McKeever Dr., Lexington, MA (US) 02420; David Scerbak, 14801 Shipman Rd., Traverse City, MI (US) 49686-9715

( * ) Notice: Subject to any disclaimer, the term of this patent is extended or adjusted under 35 U.S.C. 154(b) by 191 days.

(21) Appl. No.: 11/399,198

(22) Filed: Apr. 6, 2006

(65) Prior Publication Data

US 2007/0238604 A1    Oct. 11, 2007

(51) Int. Cl.
*C04B 35/50*    (2006.01)
(52) U.S. Cl. ...................................... 501/152; 501/153
(58) Field of Classification Search ................. 501/152, 501/153; 252/301.4 R, 62.57
See application file for complete search history.

(56) References Cited

U.S. PATENT DOCUMENTS

| | | | |
|---|---|---|---|
| 2,239,551 A | 4/1941 | Dalton et al. | |
| 2,272,342 A | 2/1942 | Hyde | |
| 2,326,059 A | 8/1943 | Norberg | |
| 4,026,816 A | 5/1977 | Ranby et al. | |
| 4,631,144 A | 12/1986 | Beers et al. | |
| 5,245,689 A | 9/1993 | Gualtieri | |
| 5,358,695 A | 10/1994 | Helble et al. | |
| 5,368,834 A | 11/1994 | Kulwicki et al. | |
| 5,378,665 A | 1/1995 | Chen et al. | |
| 5,614,596 A | 3/1997 | Laine et al. | |
| 5,652,021 A | 7/1997 | Hunt et al. | |
| 5,858,465 A | 1/1999 | Hunt et al. | |
| 5,863,604 A | 1/1999 | Hunt et al. | |
| 5,958,361 A | 9/1999 | Laine et al. | |
| 5,958,367 A | 9/1999 | Ying et al. | |
| 6,013,318 A | 1/2000 | Hunt et al. | |
| 6,114,188 A | 9/2000 | Oliver et al. | |
| 6,493,139 B1 | 12/2002 | Liu et al. | |
| 6,580,546 B2 | 6/2003 | Liu et al. | |
| 6,596,195 B2 | 7/2003 | Srivastava et al. | |
| 6,630,077 B2 | 10/2003 | Shiang et al. | |
| 7,169,326 B2 * | 1/2007 | Wu et al. | 252/301.4 F |
| 2002/0195587 A1 | 12/2002 | Srivastava et al. | |
| 2007/0187645 A1 * | 8/2007 | Lyons et al. | 252/301.4 R |

FOREIGN PATENT DOCUMENTS

| | | | |
|---|---|---|---|
| CH | 265192 | | 11/1949 |
| JP | 4-118623 | * | 4/1992 |
| JP | 5-88126 | * | 4/1993 |
| JP | 9-2867 | * | 1/1997 |
| WO | WO 00/38282 | | 6/2000 |
| WO | WO-2006013673 | | 2/2006 |

OTHER PUBLICATIONS

Preparation and characterization of $Y_3Al_5O_{12}$ (YAG) nano-powder by co-precipitation method; J.Su et al; Jul. 15, 2004; Anhal Institute of Optics and Fine Mechanics, Chinese Academy of Sciences, Hefel 230031, PR China.
Luminescence properties of $Tb^{3+:Y}{}_3Al_5O_{12}$ nanocrystallites prepared by the sol-gel methods; D. Hrenlak et al; Dec. 12, 2003; Institute of Low Temperature and Structure Research, Polish Academy of Sciences, ul.
Growth of $Tb_3Ga_5O_{12}$ fiber and bulk crystals using micro-pulling-down apparatus; Valery I. Chani et al; Nov. 15, 1999; Institute for Materials Research, Tokohu University.
Crystallization and Phase Equilibria in the $Tb_2O_3$-$Ga_2O_3$ System; Yu Udalov et al; Oct. 26, 2001: Grebenshchikov Institute of Silicate Chemistry.
Growth of terbium aluminum garnet ($Tb_3Al_5O_{12}$; TAG) single crystals by the hybrid laser floating zone machine; Mikio Geho et al; Jan. 19, 2004; Murata Manufacturing Co., Ltd., 26-10.
Compact Optical Isolator; F.J. Sansalone; Oct. 1971/vol. 10, No. 10/Applied Optics.
On the Crystallization of Terbium Aluminum Garnet; S. Granshow et al; Institut fur Kristallzuchtung; Berlin, Germany—1999 pp. 615-619.
Magneto-Optical Properties of Rare Earth (III) Aluminum Garnets C.B Rubinstein et al.; Bell Telephone Laboratories, Incorporated, Murray Hill, New Jersey; Apr. 20, 1964.
Ryan Rowley and Henry Chu, Ph.D., Processing variables of alumina slips and their effects on the density and grain size of the sintered sample, U.S. Department of Energy Journal of Undergraduate Research, pp. 71-74.
Darfus, Jason D., The Faraday Effect, May 1, 1997.
Rubinstein, C.B., et al., Magneto-Optical Properties of Rare Earth (III) Aluminum Garnets, Communications, pp. 3069-3070.
Sansalone, F.J., Compact Optical Isolator, Applied Optics, vol. 10, No. 10, pp. 2329-2331.
Geho, Mikio, et al., Growth of terblum aluminum garnet (Tb3A15O12; TAG) single crystals by the hybrid laser floating zone machine, Journal of Crystal Growth, 267 (2004) 188-193, pp. 188-193, Mar. 22, 2004.

* cited by examiner

*Primary Examiner*—Karl E Group
(74) *Attorney, Agent, or Firm*—Gifford, Krass, Sprinkle, et al.

(57) ABSTRACT

A composition is provided that includes a plurality of calcined particles of terbium aluminum oxide having a mean particle domain size of between 30 and 600 nanometers. A translucent article having a surface includes polycrystalline terbium aluminum garnet having a mean grain size from 1 to 10 microns and light scattering inclusions of aluminum-rich oxide and/or terbium-rich oxide that are present at less than 2 surface area percent of the surface. A process for forming such an article involves sintering the above provided composition at a temperature between 1500° C. and 1700° C. to yield a sintered article. The article has improved translucency and even transparency as sintering is performed under vacuum at a temperature between 1610° C. and 1680° C. Hot isostatic pressing alone or in combination with article polishing also improves article translucency.

7 Claims, 2 Drawing Sheets

SINTERED POLYCRYSTALLINE TERBIUM ALUMINUM GARNET AND USE THEREOF IN MAGNETO-OPTICAL DEVICES

FIELD OF THE INVENTION

The present invention relates to polycrystalline terbium aluminum garnet ("TAG") manufactured by sintering of nanoparticles of terbium aluminum oxide of defined composition, and to magneto-optical devices employing the polycrystalline TAG.

BACKGROUND OF THE INVENTION

Materials having magneto-optical properties are well known. Simple glasses such as borosilicate crown glass, for example, are known to rotate the plane of polarized light when placed in a magnetic field. The rotation achieved ($\theta$) is proportional to the length of the light path, $\ell$, the strength of the magnetic field B, and a magneto-optical material dependent parameter known as the Verdet constant K:

$$\theta = BK\ell.$$

The Verdet K constant may have dimensions of min·$Oe^{-1} \cdot cm^{-1}$, for instance. The rotation of light is called the Faraday effect.

Borosilicate glass has a rather low Verdet constant, and thus manufacture of devices such as Faraday rotators, isolators, modulators, etc., would require either or both of a very long path length and a very strong magnetic field. High density lead-containing glasses such as the heavy flints have a Verdet constant some four times larger than borosilicate glass, but still too low for practical magneto-optical devices. Doping such glasses with elements with high magnetic moments such as terbium increases the Verdet constant, but the value is still lower than desired, and large aperture devices are especially impractical, due to the difficulty of establishing the necessary very strong magnetic field across the device. Thus, it would be most desirable to provide materials which are translucent and which have a high Verdet constant.

F. J. Sansalone, "Compact Optical Isolator," *Applied Optics*, 10, No. 10 pp. 2329-2331 (October 1971) describes the use of crystalline TAG to produce a compact optical isolator. The magnetic field necessary for this small aperture device was able to be produced by rare earth button magnets. According to Sansalone, TAG has a Verdet constant which is an order of magnitude higher than lead glass. C. B. Rubenstein, et al., "Magneto-Optical Properties of Rare Earth (III) Aluminum Garnets," *J. App. Phys.*, 35 p. 3069-70 (1964), measured the Verdet constants of several rare earth aluminum garnets, and found TAG to have the highest Verdet constant of those tested. Thus it appears that TAG would be the material of choice for magneto-optical devices, and yet only small and sometimes thin film devices have been constructed.

In U.S. Pat. No. 5,245,689, TAG has been proposed as one of two epitaxially deposited garnet layers in a magneto-optical waveguide, although no devices employing TAG seem to have been created. U.S. Pat. No. 6,580,546 describes that Faraday rotators are activated by an electromagnet; the device also containing semi-hard magnetic materials to enhance latching and to decrease the drive current necessary to cause switching. While TAG is again mentioned, no device employing TAG appears to have been constructed. The same applies to U.S. Pat. No. 6,493,139, which discloses TAG as useful for optical switches.

The reason that TAG has not been used in practical magneto-optical devices of any size is the difficulty of providing single crystal materials. As indicated by Oliver et al. U.S. Pat. No. 6,144,188, polycrystalline garnet films may be prepared by chemical vapor deposition followed by annealing. However, these polycrystalline films do not share the optical transmission characteristics of single crystal material, and are thus useful only in certain applications. Rubenstein, in 1964, grew TAG crystals measuring 3 millimeters on a side by crystallization from lead oxyfluoride flux in platinum crucibles. The flux was removed from the solidified mass using nitric acid. The procedure uses toxic ingredients and has not been amenable to commercialization. Despite the fact that Rubenstein states that crystals measuring several centimeters on a side are grown by this technique, Sansalone, seven years later, described a Faraday rotator of TAG single crystal provided by Rubenstein, and bemoaned the fact that the longest crystalline rod was only 1 centimeter long. With this 1 centimeter TAG rod, and rare earth magnets, a rotation of about 31° was obtained at 6328 Å, and a full 45° rotation could be achieved at wavelengths shorter than about 5000 Å. Longer crystals could have achieved 45° rotation at longer wavelengths, but were apparently unavailable.

M. Geho et al., "Growth of terbium aluminum garnet ($Tb_3Al_5O_{12}$; TAG) single crystals by the hybrid laser floating zone machine," *Journal of Crystal Growth* 267, p. 188-193 (2004) discloses that TAG shows incongruent melting behavior, which prevent large size crystal growth. Instead of growing single crystals by conventional techniques, Geho used a special floating zone ("FZ") method of crystal growth, by stacking alternating sheets of aluminum oxide and terbium oxide followed by sintering to produce a porous stack. This stack was then heated in a floating zone furnace having four $CO_2$ lasers arranged radially around the rod shaped green body, and assisted by four quartz halogen lamps similarly arranged. However, while the length of the crystal does not appear to be limited in such a method, the crystal diameter is only 3 millimeters.

Thus, there exists a need for TAG magneto-optical devices in large aperture sizes, and with full rotation at all relevant wavelengths. There also exists a need for TAG precursors to form translucent or transparent TAG devices.

BRIEF DESCRIPTION OF THE DRAWINGS

FIG. 5(*b*) is a photograph of terbium aluminum oxide formed according to the procedure of Example 5 overlying graphical text "TAG" to illustrate translucency after hot isotactic pressing.

SUMMARY OF THE INVENTION

Figure 1:
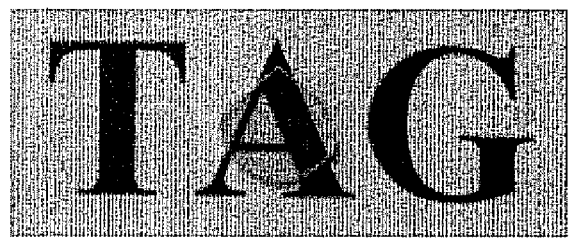
FIG. 1 is a photograph of terbium aluminum oxide formed according to the procedure of Example 1 overlying graphical text "TAG" to illustrate translucency.

A composition is provided that includes a plurality of calcined particles of terbium aluminum oxide having a mean particle domain size of between 30 and 600 nanometers.

A translucent article includes polycrystalline terbium aluminum garnet having a mean grain size from 1 to 10 microns and light scattering inclusions of aluminum-rich oxide and terbium-rich oxide that are present at less than 2 surface area percent of the surface. A process for forming such an article involves sintering the above provided composition at a temperature between 1500° C. and 1700° C. to yield a sintered article. The article has improved translucency and even transparency as sintering is performed under vacuum at a temperature between 1610° C. and 1680° C. Hot isostatic pressing alone or in combination with article polishing also improves article translucency to transparency.

DETAILED DESCRIPTION OF THE INVENTION

The present invention has utility as a precursor composition for a translucent terbium aluminum garnet (TAG) article. Through the production of a polycrystalline TAG article with magneto-optical properties suitable for device formation, difficulties associated with growing a TAG single crystal with preselected dimensions greater than 3 millimeters is overcome. An inventive precursor composition is synthesized and processed so as to inhibit formation of optically light scattering inclusions. Through control of sintering conditions and subsequent processes to densify and polish an article, a polycrystalline, transparent TAG article is formed that is particularly well suited for use as a magneto-optical element such as a Faraday rotator, optical isolator, or magneto-optical waveguide.

A precursor composition for a polycrystalline TAG article includes calcined terbium aluminum oxide particles that have a mean particle domain size of between 30 and 600 nanometers. The precursor particles if calcined at a comparatively low temperature of 700 to 800° C. for a duration of a few hours retains a crystal structure in the particles comparable to $YAlO_3$ (powder diffraction pattern 74-1334) and without intending to be bound by a particular theory is believed to be a hexagonal phase. Preferably, the mean hexagonal structure terbium aluminum oxide has a mean particle domain size of between 30 and 200 nanometers. It is appreciated that the hexagonal phase terbium aluminum oxide may well include secondary amorphous phases or secondary crystal structure forms illustratively including $(A_{3/4}B_{1/4})BO_3$. Additionally, it is appreciated that the terbium:aluminum stoichiometric atomic ratio is maintained at 3±0.01:5±0.01 in order to achieve stoichiometric TAG having a formula $Tb_3Al_5O_{12}$. It is appreciated that stoichiometric deviations in the terbium:aluminum atomic ratio away from that of TAG results in the formation of aluminum-rich oxide or terbium-rich oxide inclusions, depending on the excess metal. Aluminum-rich oxide and terbium-rich oxide are both light scattering materials and enhance the opacity of the resulting TAG article.

Optionally, a precursor composition is formulated with a fraction of the terbium atoms replaced with a metal $M^1$ where $M^1$ is Y, La, Gd, Lu or other rare earth element. Similarly, a fraction of the aluminum atoms of TAG are substituted with a metal $M^2$ where M is Sc, Ga, In or trivalent transition metal Additionally, it is appreciated that a portion of terbium atoms is replaced with $M^1$ while simultaneously a portion of aluminum atoms are replaced with metal $M^2$ to yield a substituted TAG composition having the formulation:

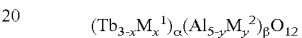

$$(Tb_{3-x}M_x^1)_\alpha(Al_{5-y}M_y^2)_\beta O_{12}$$

where x and y each independently range from 0 to 0.1, 3α is 3±0.01 and 5β is 5±0.01. More preferably, x and y each independently range in value from 0 to 0.05, and most preferably range from 0 to 0.01. Such substituent metals are added to modify the magnetic and/or optical properties of the resulting TAG article or provided to suppress formation of aluminum-rich oxide or terbium-rich oxide inclusion bodies.

A precursor composition is formed by calcining terbium aluminum oxide particles with a preselected terbium:aluminum stoichiometric atomic ratio at a temperature between 700° C. and 1300° C. The terbium aluminum oxide (TAO) particles as synthesized are noted to by X-ray powder diffraction to have a partially amorphous structure with lesser quantity hexagonal crystal structure material. With calcinations in the range of 500° C. to 700° C., the TAO exhibits predominantly a hexagonal crystal structure that converts to a garnet crystal structure with higher temperature range calcination. A transitory orthorhombic crystal structure phase is noted therebetween for some TAO powders during calcinations as shown in Table 1. The calcinations temperature and time needed for phase converting depend on the method of making original particles, such as precursors and reactor conditions.

TABLE 1

Calcination for TAG powder

| Phase Percentage (%) | AP Powder | Calcined TAG Precursor Composition | | | | | |
|---|---|---|---|---|---|---|---|
| | | 800° C. 2 hours | 1000° C. 1 hour | 1100° C. 1 hour | 1100° C. 2 hours | 1100° C. 3 hours | 1200° C. 1 hour |
| TAO-hexagonal | 100 | 100 | 93 | 0 | 0 | 0 | 0 |
| TAO-orthorhombic | 0 | 0 | 7 | 48.6 | 35 | 25 | 0 |
| TAG | 0 | 0 | 0 | 51.4 | 65 | 75 | 100 |
| Mean particle size (nm) | 73 | 56 | 65 | 87 | 88 | 109 | 171 |

The increase in the mean particle domain size observed in calcination for 3 hours at 1100° C. and 1 hour at 1200° C. in Table 1 has associated therewith a necking phenomenon indicative of material flow between contiguous particles. The extent of this phenomenon can vary with the initial crystallinity and surface chemistry of starting particles.

A terbium aluminum oxide (TAO) particulate having an amorphous or hexagonal crystal structure and a preselected terbium:aluminum atomic ratio prior to calcination is produced by a variety of conventional techniques. These techniques illustratively include flame pyrolysis, solution precipitation, and combination. Liquid phase flame spray pyrolysis represents a preferred method of terbium aluminum oxide particulate synthesis. Liquid feed flame spray pyrolysis requires terbium and aluminum precursors to be present in the form of a solution or suspension. Suitable terbium aluminum oxide liquid feed flame spray pyrolysis precursors are solutions or suspensions of terbium- or aluminum-containing compounds illustratively including complexes of carboxylates such as acetates, propionates, alkyl(hexanoates); and alkoxides. Still further precursors and the formation thereof are disclosed in U.S. Pat. No. 5,614,596 and PCT Publication WO 00/38282. Feeding such a precursor solution or suspension into a flame affords highly uniform particulates of controlled size and composition. Typical TAO particulate mean particle domain sizes range from 10 to 400 nanometers with the particulates having a generally spherical shape. Larger particles often exhibit faceting and preferential surface growth along low energy planes. Control of particulate domain size is exercised through parameters such as precursor solution or suspension feed rate, liquid atomization droplet size, flame dwell time, and flame temperature.

Regardless of the synthesis method of terbium aluminum oxide particulate, it is appreciated that stoichiometry adjustments can be made between terbium-$M^1$-aluminum-$M^2$ through the addition of additional particulate rich in the underrepresented metal atom. As translucency and transparency are dependent on limiting incorporation of light scattering voids and inclusions, preferably stoichiometry corrective addition to the particulate also includes a homogeneous mixture of the various metal atoms produced as detailed above, as opposed to a pure aluminum oxide, or terbium oxide, $M^1$-oxide or $M^2$-oxide. The resulting stoichiometrically modified terbium aluminum oxide is then calcined in air at a temperature between 700° C. and 1200° C. for a time duration ranging from 30 minutes to several hours to provide a more uniform oxygenation and atomic level homogeneity. In the course of calcination, an increase in particle domain size occurs with increased temperature and duration of calcination. The resulting calcined mass of agglomerated material is formed into an inventive precursor composition through conventional techniques such as sonication, ball milling, grinding, and combinations thereof to form calcined particles of terbium aluminum oxide having a mean particle domain size of between 30 and 600 nanometers. Preferably, the calcined particles have a mean particle domain size of between 40 and 150 nanometers. More preferably, a collection of unimodal calcined particles, regardless of mean particle domain size, have size distribution such that less than 5 number percent of the particles lie beyond 2 sigma in the statistical distribution of particle size.

It is appreciated that conventional ceramic densification techniques are operative herein to maximize green density of an article formed from the inventive precursor composition. These techniques include the use of a precursor composition particle size distribution theoretically approaching monodisperse, the use of bimodal distributions with modes of sufficiently different sizes such that smaller particles are able to fill interstices between the larger mode particles, and multimodal distributions.

A green body article is formed from a slurry in water or organic solvent of calcined TAO particles. Organic solvents operative herein illustratively include alkyl and aryl, where aryl solvents contain at least carbon atoms: $C_1$-$C_8$ alcohols, $C_2$-$C_8$ ethers, $C_2$-$C_{12}$ ketones or aldehydes, $C_3$-$C_{20}$ esters; heterocyclic solvents such as tetrahydrofuran and pyridine. The TAO content of the slurry is typically from 20 to 80 total slurry weight percent and preferably from 30 to 60 total slurry weight percent. Typically, the particles have a positive zeta potential upon dispersion in water as a slurry.

Optionally, suitable fugitive binder is added to the slurry. A fugitive binder is defined as a binder or the decomposition products thereof that is removed during sintering to greater than 99 weight percent of the binder present. Fugitive binders illustratively include polyvinylpyrrolidones, polyvinyl alcohol, polyacrylates, latexes, and mineral oil. A preferred binder is polyvinyl alcohol. Binders are typically present from 0 to 5 total slurry weight percent for press molding or slip casting, while tape casting binders are typically present from 5 to 40 total slurry weight percent. It is appreciated that slurry formation is promoted by sonication, especially in instances where optional additives are provided.

Optionally, a dispersant is also added to the slurry. Dispersants operative herein illustratively include surfactants, with the nature of the surfactant as to nonionic, cationic, or anionic and the hydrophilic-lipophilic balance (HLB) thereof being dictated by factors including the zeta potential of the precursor composition particles, and the nature of the slurry solvent. Water represents a preferred slurry solvent. Ammonium polymethacrylate, fructose, and polyoxyethylene glycol are representative specific dispersants. A dispersant is typically present from 0 to 4 total slurry weight percent. Preferably, a dispersant is selected to improve solid loading for dispersed precursor composition particles. Other conventional additives to a slurry include a thixotrope.

The slurry of calcined terbium aluminum oxide precursor composition particles are preferably filtered through a sieve or other filter media prior to formation of a green body to remove spurious contaminants and excessively large agglomerates of terbium aluminum oxide that might operate to lessen purity and/or grain density of a resulting article.

An inventive article is formed from a slurry by conventional techniques illustratively including dry pressing, slip casting, and tape casting. For dry pressing, it is appreciated that slurries are preferably subjected to granulation to form a pre-consolidated powder. It is appreciated that in instances where an article is tape cast, that an extrudable tape casting binder is present in a quantity sufficient to allow convenient tape formation. Slip casting and tape casting are appreciated to be article formation techniques well suited for the creation of complex forms and shapes that are especially difficult to form from conventional single crystal TAG. Optionally, cold isostatic pressing is employed to facilitate dimensionally uniform grain body densification. Typical cold isostatic pressing conditions include exertion of 300 megapascals for 20 minutes.

Sintering of calcined terbium aluminum oxide particle precursor composition yields an inventive TAG article. Sintering accomplishes the purpose of binder and other additive burnout, typically at temperatures up to about 700° C., followed by elevated temperature sintering. An exemplary temperature ramp for burnout is 1° C./min to 180° C., hold 5 hours, then 0.5° C./min to 250° C., hold 1 hour, then 0.5° C. 400° C. followed by 1° C./min to 500° C. Sintering temperatures range between 1500° C. and 1700° C. with the atmosphere and duration of sintering affecting the sintering temperature. Sintering occurs under vacuum, inert atmosphere, in air, and in a reducing atmosphere. Optionally, hot isostatic pressing to facilitate densification is performed during, or subsequent to sintering. Preferably, sintering occurs under vacuum. Owing to the tendency of TAG to disproportionate into aluminum-rich oxide domains and terbium-rich oxide domains upon cooling from a melt, sintering at temperatures approaching the TAG melting temperature is done with care.

Typical pressures for vacuum sintering are below 1 torr. Preferably, vacuum sintering pressures are below $10^{-3}$ torr with pressures of between $10^{-5}$ and $10^{-6}$ torr being more preferable. Preferably, vacuum sintering occurs at more than 1600° C. for a duration of 1 to 6 hours. More preferably, vacuum sintering occurs for this time duration between 1610° C. and 1680° C. in order to lessen the inclusions. The area percentage of an inclusion is determined by measuring the two-dimensional area associated with an inclusion on a given plane of an inventive article. Typically, the plane used for a determination of inclusion area percentage is the flat face of an 8 millimeter diameter pellet formed from an inventive precursor composition. Under these sintering conditions, the mean grain size of TAG domains in a given plane is from 1 to 10 microns and preferably between 1 and 5 microns. More preferably, the grain size is between 1 and 3 microns. It is noted that the grain size of the sintered article tends to increase as the precursors composition calcinations temperature increase. These results are summarized in Table 2.

Aluminum-rich oxide and/or terbium-rich oxide inclusions are present at less than 2 surface area percent of a given surface in order to afford a translucent inventive article. Preferably, the inclusions are present at less than 0.5 surface area percent. Most preferably, the inclusions are present at less than 0.1 surface area percent.

TABLE 2

Microstructure of sintered TAG articles

| Property | 1650° C.-3 hour vacuum sinter hexagonal structure (TAO) precursor | 1650° C.-3 hour vacuum sinter garnet structure (TAG) precursor |
|---|---|---|
| Grain size (microns) | 1.78 | 4.25 |
| Grain feature | Flat | Flat |
| Grain boundary | Curved | Curved |
| Inclusion size, area percentage | 0.2-0.5 microns 0.064% | 0.3-0.5 microns 0.07% |
| Intergrain pores | No | No |
| Article color | Pale yellow | Pale yellow |
| Translucency | Yes | Yes |

Figure 2:
FIG. 2 is a photograph of terbium aluminum oxide formed according to the procedure of Example 2 overlying graphical text "TAG" to illustrate translucency.
Figure 3:
FIG. 3 is a photograph of terbium aluminum oxide formed according to the procedure of Example 3 overlying graphical text "TAG" to illustrate translucency.
Figure 4:
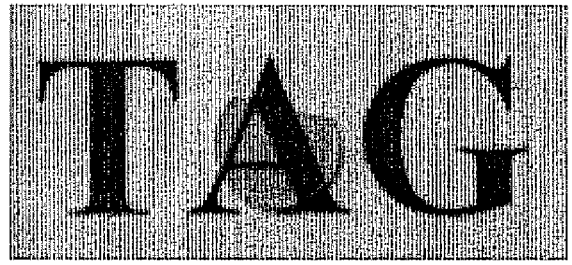
FIG. 4 is a photograph of terbium aluminum oxide formed according to the procedure of Example 4 overlying graphical text "TAG" to illustrate translucency.
Figure 5A:
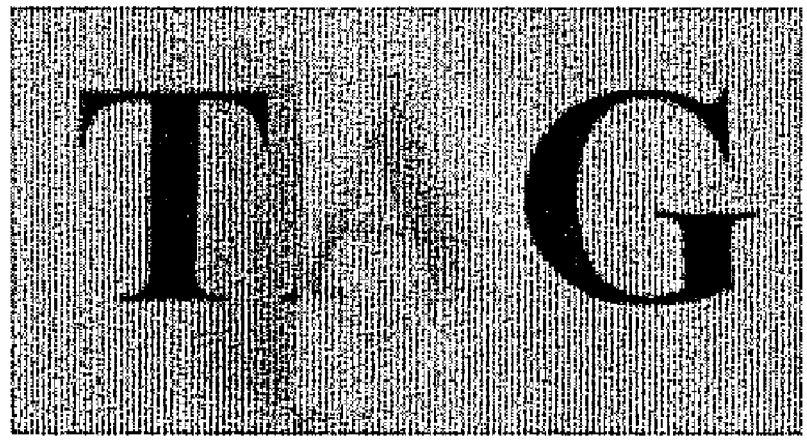
FIG. 5(*a*) is a photograph of terbium aluminum oxide formed according to the procedure of Example 5 overlying graphical text "TAG" to illustrate translucency prior to hot isotactic pressing.
Figure 5B:
Figure 6:
FIG. 6 is a photograph of terbium aluminum oxide formed according to the procedure of Example 6 overlying graphical text "TAG" to illustrate.

The present invention is further detailed with reference to the following non-limiting examples. In each instance terbium aluminum oxide particles are synthesized by liquid feed flame spray pyrolysis and characterized by a predominant amorphous, hexagonal, or mixture thereof as crystallographic phase. The powder is dry sieved to exclude coarse agglomerates and impurities having a size of greater than 150 micron. The dry sieve powder is then calcined and formed as a slurry. The slurry is subjected to ball milling and/or ultrasonic agitation and then wet sieved. The dispersion of calcined precursor particles is then dried, dry sieved and formed into a pellet. The pellet is cold isostatically pressed with 300 megapascals of force prior to being subjected to a binder burnout heating phase. After burnout of the binder and any dispersants that have been added, the resulting pellet is sintered and hot isostatically pressed. The results for Examples 1-6 are summarized in Table 3 and corresponding images of FIGS. 1-6 showing a 1 centimeter diameter pellet overlying the letter "A".

TABLE 3

Process to Form Translucent TAG

| Example | Precursor Powder | Calcinings T(° C.)-t(h) phase | Slurry Composition | Drying | Sintering atmosphere T(° C.)-t(h) | Hot Isostatic Press (HIP) T(° C.)-t(h) | Figure |
|---|---|---|---|---|---|---|---|
| 1 | TAO hexagonal phase | 1100-1 orthorhombic-garnet | 40 g powder 60 g DI H$_2$O 0.4 g PVA 0.6 g PEG | oven | H$_2$/He 1650-6 | 1670-4 | 1 |
| 2 | TAO hexagonal phase | 1100-1 orthorhombic-garnet | 40 g powder 60 g DI H$_2$O 0.4 g PVA 0.6 g PEG | oven | vacuum 1650-6 | 1670-4 | 2 |
| 3 | TAO hexagonal phase | 1100-1 orthorhombic-garnet | 40 g powder 60 g DI H$_2$O 0.4 g PVA 0.6 g PEG | freeze granulated freeze dried | vacuum 1650-6 | 1670-4 | 3 |
| 4 | 0.005% Ce doped TAO hexagonal phase | 800-2 hexagonal-orthorhombic | 20 g powder 45 g DI H$_2$O 0.4 g PVA 0.15 Darvan | oven | vacuum 1650-6 | 1670-4 | 4 |
| 5 | TAO hexagonal phase | 800-2 hexagonal-orthorhombic | 40 g powder 60 g DI H$_2$O 0.4 g PVA 0.4 g PEG 0.4 g Darvan | milling 24 h, then oven | Pre-fire 1200-2 (air), 1650-4 (vacuum) | 1680-4 | 5a pre-HIP 5b post-HIP |
| 6 | TAO hexagonal phase | 1000-3 hexagonal orthorhombic-garnet | 40 g powder 60 g DI H$_2$O | oven | vacuum 1650-6 | 1680-4 | 6 |

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A translucent article having a surface comprising: translucent polycrystalline terbium aluminum garnet having a mean grain size of from 1 to 10 microns and inclusions of material selected from the group consisting of aluminum-rich oxide and terbium-rich oxide, said inclusions present at less than 2 surface area percent of the surface.

2. The article of claim 1 wherein said polycrystalline terbium aluminum garnet is obtained from a composition comprising a plurality of calcined particles of terbium aluminum oxide having a mean particle domain size of between 30 and 600 nanometers.

3. The article of claim 1 wherein said inclusions have a mean size of less than 0.5 microns.

4. The article of claim 3 wherein said inclusions are present at less than 0.5 surface area percent.

5. The article of claim 1 wherein said inclusions are present at less than 0.1 surface area percent.

6. The article of claim 1 wherein said polycrystalline terbium aluminum garnet is transparent.

7. The article of claim 1 wherein said polycrystalline terbium aluminum garnet is fashioned as a device selected from the group consisting of: Faraday rotator, optical isolator, and magneto-optical waveguide.

* * * * *

UNITED STATES PATENT AND TRADEMARK OFFICE
CERTIFICATE OF CORRECTION

PATENT NO. : 7,427,577 B2  Page 1 of 1
APPLICATION NO. : 11/399198
DATED : September 23, 2008
INVENTOR(S) : Yin Tang et al.

It is certified that error appears in the above-identified patent and that said Letters Patent is hereby corrected as shown below:

Title page, item [73] insert --Assignee: Nanocerox, Inc., 712 State Circle, Ann Arbor, MI 48108--

Signed and Sealed this

Fourth Day of August, 2009

JOHN DOLL
*Acting Director of the United States Patent and Trademark Office*